United States Patent Office 2,721,792
Patented Oct. 25, 1955

2,721,792

NITRO-PARAFFIN PROPELLANT

John A. Hannum, Detroit, Mich., assignor, by mesne assignments, to Borg-Warner Corporation, Chicago, Ill., a corporation of Illinois No Drawing. Application May 7, 1946,
Serial No. 668,006

3 Claims. (Cl. 52—.5)

This invention relates to a self-sufficient fuel or propellant for a prime mover, such as a gas turbine or a reciprocating engine, in which at least part of the oxygen required for combustion is derived from a normally solid oxidizing agent and more particularly an ammonium salt that is dispersed in the fuel either as a suspension or in the form of a solution. The fuel component will be selected from the group of nitro and polynitro aliphatic organic compounds.

The propellant of the present invention is of that class in which the oxygen necessary to the combustion of the fuel is in combined form and is in mixture with a liquid fuel. This liquid propellant may be so proportioned as to its oxygen and fuel content that sufficient oxygen is provided by the mixture itself to burn all of the fuel. It is also possible to supply only enough oxygen in this liquid to burn part of the fuel and for complete combustion add additional oxygen from another source.

Fuels of this type are useful in prime movers where it is undesirable or practically impossible to secure oxygen for combustion from the environment in which the prime mover is operated. Among other things, a reciprocating engine to drive a submerged submarine or torpedo and a gas turbine or other reaction device for driving aircraft and surface vehicles are examples of such prime movers. In operation of aircraft at high altitudes the supply of oxygen due to the rarified atmosphere becomes insufficient to support the combustion of the fuel needed to drive the ship. For this reason it is essential that the aircraft carry all or at least part of the necessary oxygen if it is to operate under such conditions.

Gas turbines as an important example of prime movers have become well known, but heretofore have been subject to a marked disadvantage in that it has been necessary to provide a compressor as an integral part of the unit in order that the requisite amount of oxygen might be drawn from the surrounding atmosphere and made available for combustion of the fuel. Such a compressor is operated to compress a large volume of air at atmospheric volume and pressure to a greatly decreased volume with consequent pressure increase. The necessity of supplying this auxiliary unit has resulted in gas turbines having greater volume and more weight than is desired for many purposes. This is particularly true in the adaptation of gas turbines as a source of power to drive aircraft. Furthermore complications in construction have arisen due to the structural requirements of a unit adapted to handle fluid under the pressures attained by the compressor.

The use of gas turbines in jet propelled aircraft with fuels now available subjects the aircraft to a very marked ceiling limitation. As an aircraft rises higher and higher from the surface of the ground, the amount of oxygen in the surrounding atmosphere available for combustion of the fuel becomes more limited. This fact, together with the requirement for compression of the air, even at ground levels, to supply the requisite oxygen, is a definite limiting factor to the ceiling available with aircraft using this type of propulsion.

Gas turbines as now built have also been subject to a marked disadvantage at the time they are started in operation. They, like other types of prime movers, are not self-starting. However, in the case of such a turbine, the auxiliary power required to place the unit in rotation to perform work is much greater than, for example, with an Otto cycle internal combustion engine.

Even after a gas turbine of the presently known type is in operation there is a further disadvantage to its use. If the entire output of the turbine be considered as one hundred percent, it is very possible that under certain types of use only ten percent of this output will be devoted to performing work, namely to accomplishing the ultimate function for which the turbine is intended. The balance of the output of the unit is required to compress from atmospheric pressure the air that is required for combustion of the fuel that drives the turbine.

It is the general object of the present invention to provide an improved propellant for the uses indicated that combines within itself all, or a predetermined percentage, of the oxygen necessary for the substantially complete combustion of the fuel component. This invention contemplates as a further object, not only a propellant that is itself completely self-contained in regard to the oxygen required, but also a propellant in which only a major portion of the required oxygen is embodied therein, and in which the balance of the required oxygen is drawn from some other source, either from the atmosphere or even from some other oxygen-containing substance.

A further object of the invention is to provide a prime mover propellant that at the point of combustion comprises a fuel selected from the group of nitro and polynitro aliphatic hydrocarbons that itself contains oxygen available for combustion, together with a concentrated oxidizing agent having available oxygen in combined form to supply more of the total oxygen required. A more specific object is to provide a propellant comprising a nitro or polynitro aliphatic hydrocarbon fuel component and an oxidant in the form of an ammonium salt as, for example, ammonium nitrate or ammonium perchlorate. Still another object is to provide such a propellant using nitromethane as the fuel with an ammonium salt as the oxidant.

Generally a propellant of the type contemplated by the present invention will comprise a liquid containing a liquid fuel and an oxidizing agent that is normally a solid. A solid oxidizing agent is considered to be one that exists in solid form at temperatures below 125° F. The fuel embodied in the propellant of the present invention will be a nitroparaffin such as mononitromethane $CH_3(NO_2)$, (hereafter referred to simply as nitromethane) that itself contains oxygen that may be used during combustion. It is contemplated that other fuels from the class of nitro and polynitro aliphatic hydrocarbon liquids may be used. For the purposes of this invention a liquid is defined as boiling above 15° C. and melting below 50° C. at sea level atmospheric pressure.

Examples of such fuels, in addition to nitromethane, are:

Nitroethane, $CH_3 \cdot CH_2 \cdot NO_2$
1-nitropropane, $CH_3 \cdot CH_2 \cdot CH_2 \cdot NO_2$
2-nitropropane, $(CH_3)_2CH \cdot NO_2$
1,1-dinitropropane, $C_2H_5 \cdot CH(NO_2)_2$
2,2-dinitropropane, $(CH_3)_2C(NO_2)_2$
1,2-dinitropropane, $CH_2NO_2 \cdot CHNO_2 \cdot CH_3$
1,3-dinitropropane, $CH_2NO_2 \cdot CH_2 \cdot CH_2NO_2$
1,1-dinitroethane, $CH_3 \cdot CH(NO_2)_2$ Such nitro and polynitro aliphatic hydrocarbons included as fuels, as distinguished from oxidants, within the scope of this invention include mononitromethane, dinitroethane and trinitropropane and those nitroethanes and nitropropanes below them in oxygen content but no nitromethanes, nitroethanes or nitropropanes that are higher in oxygen content, as for instance dinitromethane. These are all to be distinguished from aromatic fuels such as the nitrobenzols that are dangerous to handle even by skilled persons, to say nothing of persons who are not skilled in this art.

The fuel portion of the propellant mixture is limited to those nitro and polynitro aliphatic hydrocarbons that contain not more than one nitro-group for each carbon atom present. Under many conditions for most efficient use the fuel and oxidant will be combined in substantially stoichiometric proportions. This is the most economical use of the materials because after combustion there remains no appreciable amount of either unconsumed fuel or oxidant.

The advantage of using nitromethane or a similar oxygen-containing fuel as listed above resides in the fact that it contains a considerable amount of oxygen that is available during combustion to burn part of the carbon or hydrogen in the fuel. This in turn does not require the inclusion in the propellant of as much oxidizing agent as would otherwise be necessary.

A propellant prepared in accord with the present invention preferably will contain a sufficient amount of oxidizing agent to provide with the oxygen of the fuel the required total amount of oxygen for complete combustion of the fuel. As indicated above, the proper oxygen content can be attained by providing the constituents in direct proportion to their molecular weights and the number of molecules called for in their reaction equation.

The solid oxidizing agent used in the present invention is taken from a group of oxygen-containing compounds of ammonia; preferred examples are ammonium perchlorate and ammonium nitrate.

In cases where it is desired that the propellant shall be self-contained insofar as the oxygen required for combustion is concerned, the propellant is substantially a stoichiometric mixture. Preferably the fuel to be selected from the group listed above is nitromethane. In like manner the preferred propellant embodying this invention will use either ammonium nitrate ($NH_4NO_3$) or ammonium perchlorate ($NH_4ClO_4$) as the oxidizing agent. In the case of ammonium nitrate as the oxidizing agent the ingredients of such a propellant and the proportions by weight should be approximately as follows:

| | Percent |
|---|---|
| Ammonium nitrate | 61.0 |
| Nitromethane | 39.0 |

In the case of ammonium perchlorate as the oxidizing agent the ingredients should be included in approximately the following proportions by weight:

| | Percent |
|---|---|
| Ammonium perchlorate | 53.5 |
| Nitromethane | 46.5 |

It will be understood that the invention is not limited to the specific percentages of constituents set out above. On the contrary it is contemplated that insofar as the proportions set out are concerned a reasonable variation from the ideal calculated percentages is permissible without departing from the scope of this invention. Thus propellants consisting of the following ingredients may be used in practicing the invention when they are mixed in accordance with the ranges of weight indicated. In the case of a fuel embodying nitromethane and ammonium nitrate permissible variations by weight are as follows:

| | Percent |
|---|---|
| Ammonium nitrate | 50–75 |
| Nitromethane | 50–25 |

In similar fashion propellants embodying this invention and consisting of ammonium perchlorate and nitromethane will lie within the following percentages by weight:

| | Percent |
|---|---|
| Ammonium perchlorate | 40–65 |
| Nitromethane | 60–35 |

Compositions in terms of percentage by weight are given below for other nitro and polynitro aliphatics that lie within the scope of the present invention, and for purposes of comparison the percentage of compositions of the nitromethane containing fuels are repeated. It should be pointed out that while it will generally be the case that the fuel component will consist of only one of the following ingredients it is contemplated to be within the scope of this invention to use in the propellant a fuel that contains one or more of these nitro and polynitro aliphatics. In such case the proposed proportions for stoichiometric mixtures may be arrived at in accord with the molecular weights and the reaction formula for the particular combination that is contemplated. Since these calculations lie within the ability of one skilled in this art they will not be given here.

When ammonium nitrate is the oxidant that is used, the following table indicates the percentages by weight of fuel that are to be used. In the first column the fuel is listed and in the second column the percentage by weight if a stoichiometric mixture of the fuel and ammonium nitrate is desired. In the third column is listed the range of percentages by weight of fuel that will provide a satisfactory product when combined with ammonium nitrate. In the case of both columns 2 and 3 the amount of ammonium nitrate to be used may be obtained by subtracting from 100% the percentage of the fuel indicated. This table is as follows:

| Fuel | Fuel for Stoichiometric Mixture | Range of Percentages of Fuel |
|---|---|---|
| | Percent | Percent |
| nitromethane | 39.0 | 25–50 |
| nitroethane | 20.7 | 10–35 |
| 1-nitropropane | 15.6 | 8–30 |
| 2-nitropropane | 15.6 | 8–30 |
| 1,1-dinitropropane | 30.2 | 20–45 |
| 2,2-dinitropropane | 30.2 | 20–45 |
| 1,2-dinitropropane | 30.2 | 20–45 |
| 1,3-dinitropropane | 30.2 | 20–45 |
| 1,1-dinitroethane | 49.2 | 30–60 |

If the oxidant to be used is ammonium perchlorate the following table governs in which again the first column is the fuel, the second column the percent by weight of fuel required for a stoichiometric mixture with ammonium perchlorate and the third column indicates the permissible range that may be used for a particular fuel. Again the amount of ammonium perchlorate to be added is obtained by subtracting from 100% the indicated percentage by weight of the fuel.

| Fuel | Fuel for Stoichiometric Mixture | Range of Percentages of Fuel |
|---|---|---|
| | Percent | Percent |
| nitromethane | 46.4 | 45–60 |
| nitroethane | 26.2 | 25–40 |
| 1-nitropropane | 20.2 | 10–35 |
| 2-nitropropane | 20.2 | 10–35 |
| 1,1-dinitropropane | 37.0 | 25–50 |
| 2,2-dinitropropane | 37.0 | 25–50 |
| 1,2-dinitropropane | 37.0 | 25–50 |
| 1,3-dinitropropane | 37.0 | 25–50 |
| 1,1-dinitroethane | 56.9 | 40–65 |

The combination of fuel and oxidant set out above may be used alone or in combination with still another ingredient and the addition of such other ingredients to a propellant mixture is contemplated as within the scope of this invention as defined in the claims.

From the foregoing tables it will be seen that the invention broadly may comprise a nitro or polynitro aliphatic fuel and ammonium nitrate in substantially the following percentages by weight:

| | Percent |
|---|---|
| Ammonium nitrate | 92–35 |
| Nitro or polynitro aliphatic fuel | 8–65 | and in the same manner the fuel and ammonium perchlorate may be used within the following range of percentage by weight:

| | Percent |
|---|---|
| Ammonium perchlorate | 90–30 |
| Nitro or polynitro aliphatic fuel | 10–70 |

The fuel and the oxidizing agent are supplied to the point of combustion mixed and in liquid form. "Point of combustion" is a term not to be confined to the actual point of flame propagation but is construed to be the region to which the propellant is fed preparatory to the actual burning.

The propellant that is the subject of this invention may be used for various purposes and in various ways. Its use in a gas turbine or other prime mover has been emphasized here but it is not to be limited to such use. It may be used in any apparatus and environment where combsution of a fuel is employed for purposes of propulsion.

I claim:

1. A self-sufficient liquid propellant lending itself to use as a fuel in a gas turbine consisting of a self-contained stoichiometric mixture of approximately 53½% by weight of ammonium perchlorate and approximately 46½% by weight of nitromethane, the propellant as a whole taking the physical form of a liquid devoid of extraneous solid combustibles in which the ammonium perchlorate is dispersed in finely divided form and which is susceptible of being fed in liquid form to the region wherein the propellant is prepared for burning at the point of flame propagation in the combustion chamber of the turbine.

2. A self-sufficient liquid propellant lending itself to use as a fuel in a gas turbine consisting of a self-contained stoichiometric mixture of approximately 61% by weight of ammonium nitrate and approximately 39% by weight of nitromethane, the propellant as a whole taking the physical form of a liquid devoid of extraneous solid combustibles in which the ammonium nitrate is dispersed in finely divided form and which is susceptible of being fed in liquid form to the region wherein the propellant is prepared for burning at the point of flame propagation in the combustion chamber of the turbine.

3. A self-sufficient liquid propellant lending itself to use as a fuel in a gas turbine consisting essentially of a self-contained stoichiometric mixture of an oxidant selected from the group consisting of ammonium nitrate and ammonium perchlorate and a fuel component selected from the group consisting of nitromethane, nitroethane, 1-nitropropane, 2-nitropropane, 1,1-dinitropropane, 2,2-dinitropropane, 1,2-dinitropropane, 1,3-dinitropropane, 1,1-dinitroethane, trinitropropane, and mixtures thereof, the propellant as a whole taking the physical form of a liquid devoid of extraneous solid combustibles in which the oxidant is dispersed in finely divided form and which is susceptible of being fed in liquid form to the region wherein the propellant is prepared for burning at the point of flame propagation in the combustion chamber of the turbine.

References Cited in the file of this patent

UNITED STATES PATENTS

| | | |
|---|---|---|
| 914,624 | Winand | Mar. 9, 1909 |
| 1,512,354 | Maxim | Oct. 21, 1924 |
| 1,985,968 | Wyler | Jan. 1, 1935 |
| 2,287,093 | Ellis | June 23, 1942 |
| 2,325,064 | Lawrence | July 27, 1943 |
| 2,325,065 | Lawrence | July 27, 1943 |
| 2,355,817 | Morrow | Aug. 15, 1944 |
| 2,433,932 | Stosick | Jan. 6, 1948 |

FOREIGN PATENTS

| | | |
|---|---|---|
| 15,852 | Great Britain | 1905 |

OTHER REFERENCES

Guttmann: "Manufacture of Explosives," MacMillan & Co., N. Y., 1895, vol 2, page 225.

"The Bulletin of American Interplanetary Society," No. 6, January 1931, page 2, article by Lemkin.

"Astronautics," No. 29, September 1934, article by Bull page 6.